United States Patent
Timmermann et al.

(10) Patent No.: US 6,344,535 B1
(45) Date of Patent: Feb. 5, 2002

(54) POLYETHER ESTER AMIDES

(75) Inventors: Ralf Timmermann, Krefeld; Wolfgang Schulz-Schlitte, Langenfeld; Michael Voigt, Duisburg, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/554,725

(22) PCT Filed: Nov. 20, 1998

(86) PCT No.: PCT/EP98/07458

§ 371 Date: May 18, 2000

§ 102(e) Date: May 18, 2000

(87) PCT Pub. No.: WO99/28371

PCT Pub. Date: Jun. 10, 1999

(30) Foreign Application Priority Data

Dec. 3, 1997 (DE) .......................................... 197 53 534
Dec. 3, 1997 (DE) .......................................... 197 53 532

(51) Int. Cl.[7] .................. C08G 69/44; C08G 63/00; C08G 73/16; C08L 77/12; C08L 79/09

(52) U.S. Cl. .................. 528/310; 528/271; 528/272; 528/288; 528/292; 528/302; 528/332; 525/420; 525/425; 525/432; 525/433; 525/434; 525/437

(58) Field of Search .................. 528/288, 271, 528/272, 292, 310, 302, 332; 525/420, 432, 425, 433, 434, 437

(56) References Cited

U.S. PATENT DOCUMENTS

| | | | | | |
|---|---|---|---|---|---|
| 4,207,410 | A | * | 6/1980 | Burzin et al. | 528/288 |
| 4,208,493 | A | | 6/1980 | Deleens et al. | 525/420 |
| 4,230,838 | A | | 10/1980 | Foy et al. | 525/408 |
| 4,238,582 | A | | 12/1980 | Deleens et al. | 525/430 |
| 4,332,920 | A | | 6/1982 | Foy et al. | 525/408 |
| 4,376,856 | A | | 3/1983 | Tanaka et al. | 528/292 |
| 4,438,240 | A | | 3/1984 | Tanaka et al. | 525/420 |
| 4,587,309 | A | | 5/1986 | Tanaka et al. | 525/419 |
| 5,061,612 | A | | 10/1991 | Kiyohara et al. | 430/533 |

FOREIGN PATENT DOCUMENTS

JP      01-045429 A    *    8/1987

* cited by examiner

*Primary Examiner*—P. Hampton-Hightower
(74) *Attorney, Agent, or Firm*—Joseph C. Gil; Aron Preis

(57) ABSTRACT

Polyether ester amides having high water vapor permeability are disclosed. The amides which are prepared simply and reliably, crystallize quickly, are biodegradable and/or compostable, and are suitable in the manufacture of films by extrusion.

6 Claims, No Drawings

POLYETHER ESTER AMIDES

FIELD OF THE INVENTION

The invention relates to polyether ester amides suitable for film extrusion.

BACKGROUND OF THE INVENTION

DE-A 25 23 991, DE-A 28 02 989, DE-A 28 56 787 describe copolyether ester amides which are produced on the basis of short-chain acid-terminated polyamide units, preferably on the basis of PA 11, by condensation with hydroxyl-functional polyethers and mono-functional acids.

This production method is very complex and unreliable as production is multi-stage and only with difficulty can the stoichiometry be maintained in order to obtain genuinely high-molecular polymers ($\overline{M}$ w>15,000).

DE-A 31 45 998 describes polyether ester amides comprising aminocarboxylic acids, dicarboxylic acids and long-chain polyethers. The polymers obtained are distinguished by low molecular weights and are not suitable for films to be extruded from them, for example.

EP-A 0 163 902 and EP-A 0 095 893 describe polyether ester amides comprising lactams or aminocarboxylic acids, dicarboxylic acids and long-chain polyethers.

U.S. Pat. No. 4,230,838 describes polyether ester amides comprising an acid-terminated polyamide, dicarboxylic acids and polytetramethylene glycol.

The above-mentioned applications and the U.S. patent describe polyether ester amides composed in block-like manner which have high elasticities but no reference is made to the properties of high water vapour permeability of these polyether ester amides.

EP-A 0 378 015 describes polyether ester amides with good water vapour permeability which are again composed in block-like manner and are produced from acid-terminated polyamides and hydroxyl-functional polyethers. It is difficult to maintain the stoichiometry accurately in order to obtain polymers with high molecular weights. Polymers with lower molecular weights are not very suitable for film extrusion.

BRIEF SUMMARY OF THE INVENTION

The object of the invention is to provide polyether ester amides which have high water vapour permeability, are suitable for use in film extrusion and can be produced simply and reliably and crystallize quickly.

The polyether ester amides according to the invention are also biodegradable and/or compostable.

DETAILED DESCRIPTION OF THE INVENTION

It has been found that polyether ester amides which are composed of lactams, dicarboxylic acids and a mixture of short-chain and long-chain diols and have a random arrangement of the ester and amide segments meet these requirements.

The production of these polyester amides is substantially simpler than the methods described hitherto as a multi-stage mode of operation is not necessary (prior synthesis of acid-terminated short-chain polyamides) and the stoichiometry of the synthesis can be maintained very satisfactorily by the additional use of short-chain diol compounds so that very high-molecular polyether ester arnides which are outstandingly suitable for extrusion applications are obtained.

The invention therefore provides polyether ester amides which have a random arrangement of the ester and amide segments and wherein the alcohol component consists of monomeric and oligomeric diols.

The content of oligomeric diol, related to the total content of the alcohol component, is generally 3 to 99, preferably 5 to 80 mole %, particularly preferably 15 to 80 mole %, particularly 15 to 50 mole %.

The polyether ester amides are preferably composed of the following monomers:

Oligomeric polyols consisting of polyethylene glycols, polypropylene glycols, polyglycols composed in random or block-like manner comprising mixtures of ethylene oxide or propylene oxide, or polytetrahydrofurans with molecular weights (weight average) between 100 and 10,000 and monomeric diols, preferably $C_2$–$C_{12}$-alkyl diols, particularly $C_2$–$C_6$-alkyl diols, such as and preferably ethylene glycol, butane-1,4-diol, propane-1,3-diol, hexane-1,6-diol, and at least one monomer selected from the group of the dicarboxylic acids, preferably $C_2$–$C_{12}$-, particularly preferably $C_2$–$C_6$-alkyl dicarboxylic acids, such as and preferably oxalic acid, succinic acid, adipic acid, also in the form of their respective esters (methyl, ethyl etc.), alkyl hydroxycarboxylic acids with preferably 2 to 12 carbon atoms in the alkyl chain and lactones such as and preferably caprolactone inter alia, aminoalcohols preferably with 2 to 12 carbon atoms in the alkyl chain, such as and preferably ethanolamine, propanolamine, cyclic lactams preferably with 5 to 12, preferably 6 to 11 C atoms, such as and preferably ε-caprolactam or laurinlactam etc., ω-aminocarboxylic acids preferably with 6 to 12 C atoms in the alkyl chain such as and preferably aminocaproic acid etc., mixtures (1:1 salts) comprising $C_2$–$C_{12}$-alkyl dicarboxylic acids, such as and preferably adipic acid, succinic acid and $C_2$–$C_{12}$-dialkyl amines, preferably $C_4$–$C_6$-dialkyl amines, such as and preferably hexamethylene diamine, diaminobutane.

Both hydroxyl- or acid-terminated polyesters with molecular weights between 300 and 10,000 may also be used as ester-forming component.

The polyether ester amides according to the invention may further contain 0.05 to 5 wt. %, preferably 0.1 to 1 wt. % of branching agents. These branching agents may be trifunctional alcohols such as trimethylolpropane or glycerol, tetrafunctional alcohols such as pentaerythritol, trifunctional carboxylic acids such as citric acid or tri- or tetrafunctional hydroxycarboxylic acids for example. The branching agents increase the melt viscosity of the polyether ester amides according to the invention to the extent that extrusion blow moulding is possible with these polymers.

The content of the ether and ester contents in the polymer is generally 5 to 85, preferably 20 to 80 wt. %, related to the total polymer.

The polyether ester amides according to the invention generally have an average molecular weight ($\overline{M}$ w determined by gel chromatography in cresol against polystyrene as standard) of 10,000 to 300,000, preferably 15,000 to 150,000, particularly 15,000 to 100,000.

Synthesis may be both by the "polyamide method" by stoichiometric mixing of the starting components, optionally with addition of water and subsequent removal of water from the reaction mixture and by the "polyester method" by addition of an excess of diol with esterification of the acid groups and subsequent interesterification and/or transamidation of these esters. In the latter case, both water and the excess glycol are distilled off again. The reaction generally takes place at temperatures of 180 to 280° C. and at reduced pressure, preferably <5 mbars, particularly <1 mbar.

When producing the polyether ester amides according to the invention, suitable catalysts may be used to catalyze the esterification and/or amidation reactions. These include titanium compounds for the esterifications and/or phosphorus compounds for the amidation reactions for example. These catalysts are known from the prior art.

The polyether ester amides according to the present invention may be mixed with fillers and reinforcing agents and conventional additives. Generally speaking up to 80 wt. % (related to polyether ester amide) of fillers and reinforcing agents may be added.

Inorganic materials are generally used as fillers and reinforcing agents. These are fibrous reinforcing agents, such as glass and carbon fibres, and mineral fillers such as talc, mica, chalk, kaolin, wollastonite, gypsum, quartz, dolomite, silicates.

The fillers and reinforcing agents may also be surface-treated.

In general, glass fibres have a fibre diameter between 8 and 14 $\mu$m and may be used as continuous fibres or as cut or ground glass fibres, it being possible for the fibres to be finished with a suitable sizing system and an adhesion promoter and/or adhesion promoter system based on silane.

The polyether ester amides may further contain 1 to 90, preferably 10 to 60, particularly 15 to 50 parts by weight (related to polyether ester amide) of starch, modified starch, cellulose and/or modified cellulose. The starch described in WO 96/31 561 may be used as starch for example.

The following may also be considered as conventional additives:

UV stabilizers, antioxidants, pigments, dye, nucleating agents, crystallization accelerators and/or retarders, flow auxiliary substances, lubricants, mould release agents, flame-proofing agents, hydrophobing agents. Plasticizers and/or impact modifiers may also be added.

The polyether ester amides according to the invention may also be used as blend with biodegradable polymers. These include, for example, aliphatic polyesters such as polycaprolactone, aliphatic-aromatic polyesters comprising, for example, terephthalic acid, butanediol and adipic acid, polyhydroxybutyric acid, polylactides and copolymers thereof, polyester urethanes (e.g. EP-A 593 975).

The mixtures according to the invention comprising polyether ester amide and fillers and reinforcing agents and optionally further additives may be produced by mixing the respective ingredients in known manner and melt-compounding or melt-extruding them at conventional temperatures, such as 180° C. to 300° C., in conventional equipment such as internal mixers, extruders, twin-screw extruders.

The polyether ester amides of the invention and their above-mentioned mixtures may be used in injection moulding, as fibre or film or in the non-woven field (spun-bond or melt-blown) particularly for the production of films, by blow extrusion for example.

EXAMPLES

Example 1

246.6 g of caprolactam, 28.2 g of adipic acid, 29.5 g of butanediol and 78.4 g of polyethylene glycol 200 are combined together with titanium tetraisopropylate as catalyst and heated to 240° C. under nitrogen. After water has been distilled off the pressure is reduced stepwise to 1 mbar.

After 3 hours polycondensation time a colourless, high-molecular material (relative viscosity of 2.9 measured in 1 wt. % solution in m-cresol at 25° C.) with a melting point of 134° C. is obtained.

$\overline{M}$ w=25,000, measured by GPC in cresol against polystyrene as standard.

Example 2

710 g of adipic hexamethylene diamine, 253 g of adipic acid, 184 g of diethylene glycol and 1380 g of polyethylene glycol 400 are combined together with titanium tetraisopropylate as catalyst and heated to 240° C. under nitrogen. After water has been distilled off the pressure is reduced stepwise to 1 mbar.

After 3 hours polycondensation time a colourless, high-molecular material (relative viscosity of 3.2 measured in 1 wt. % solution in m-cresol at 25° C.) with a melting point of 186° C. is obtained.

$\overline{M}$ w=28,000, measured by GPC in cresol against polystyrene as standard.

Example 3

256.6 g of caprolactam, 66.0 g of adipic acid, 20.4 g of butane-1,4-diol, 108.0 g of polyethylene glycol (PEG 400, BASF), 3.03 g of trimethylolpropane are heated to 250° C. under nitrogen with titanium tetraisopropylate as catalyst. As the distillation rate decreases, water jet vacuum, then oil pump vacuum (approx. 1 mbar) is slowly applied. Polycondensation and cooling take place for 3 hours at this temperature.

A high-molecular polymer with $\eta_{rel}$ 3.0 (1 wt. % in m-cresol at 25° C.) is obtained. The melting point is 155.4° C., the crystallization temperature 92.9° C. (DSC measurement).

Example 4

653 g of caprolactam, 253 g of adipic acid, 156 g of butane-1,4-diol and 1,380 g of PEG 400 are heated in trimethylolpropane to 250° C. under nitrogen with titanium tetraisopropylate as catalyst. As the distillation rate decreases, water jet vacuum, then oil pump vacuum (approx. 1 mbar) is slowly applied. Polycondensation and cooling take place for 3 hours at this temperature.

A high-molecular polymer with $\eta_{rel}$ 3.0 (1 wt. % in m-cresol at 25° C.) is obtained.

The melting point is 118.7° C., the crystallization temperature 73.3° C. (by DSC).

Comparative Test 557 g of caprolactam, 287.8 g of adipic acid, 221.0 g of butane-1,4-diol and 6.6 g of trimethylolpropane are heated to 250° C. under nitrogen with titanium tetraisopropylate as catalyst. As the distillation rate decreases, water jet vacuum, then oil pump vacuum (approx. 1 mbar) is slowly applied. Polycondensation and cooling take place for 3 hours at this temperature.

A high-molecular polymer with $\eta_{rel}$ 2.8 (1 wt. % in m-cresol at 25° C.) is obtained.

The melting point is 118.7° C., the crystallization temperature 41.4° C. (DSC measurements).

The water vapour permeability at 23° C./85% relative humidity, measured on a 20 $\mu$m thick film to DIN 53 122 Part 1 is:

Example 1: 420
Example 2: 1120
Example 3: 780
Example 4: 920
Comparative example: 210.

What is claimed is:

1. A polyether ester amide which has a random arrangement of ester and amide segments wherein alcohol component consists of
   a) at least one oligomeric diol selected from the group consisting of polyethylene glycols, polypropylene glycols, polyglycols composed randomly or in block-like manner from mixtures of ethylene oxide or propylene oxide, and polytetrahydrofurans with weight average molecular weight of between 100 and 10,000 and
   b) at least one monomeric diol selected from the group consisting of $C2$–$C_{12}$-alkyl diols,
and wherein acid component consists of
   c) one or more monomers selected from the group consisting of $C_2$–$C_{12}$-alkyl dicarboxylic acids, $C_2$–$C_{12}$-alkyl hydroxycarboxylic acids, amino alcohols with 2 to 12 C atoms in the alkyl chain, cyclic lactams with 5 to 12 C atoms, -aminocarboxylic acids with 6 to 12 C atoms, and salts of a 1:1 mixture of $C_2$–$C_{12}$-alkyl dicarboxylic acids and $C_2$–$C_{12}$-dialkyl amines.

2. Polyether ester amides according to claim 1, wherein the ester content is 5 to 85 wt. %, the amide content 15 to 95 wt. %, related to the total polymer in each case.

3. Polyether ester amides according to claim 1, wherein the content of oligomeric diol, related to the total content of the alcohol component, is 3 to 99 mole %.

4. Polyether ester amides according to claim 1, wherein the content of oligomeric diol is 5 to 50 mole %.

5. Mixture comprising polyether ester amides according to claim 1 with fillers and reinforcing agents and optionally conventional additives.

6. Injection moulded articles, films, fibres and non-woven material obtainable from polyether ester amides according to claim 1.

* * * * *